Dec. 26, 1933.   F. V. McKINLESS, JR   1,941,217
BROACHING TOOL
Filed Aug. 17, 1932
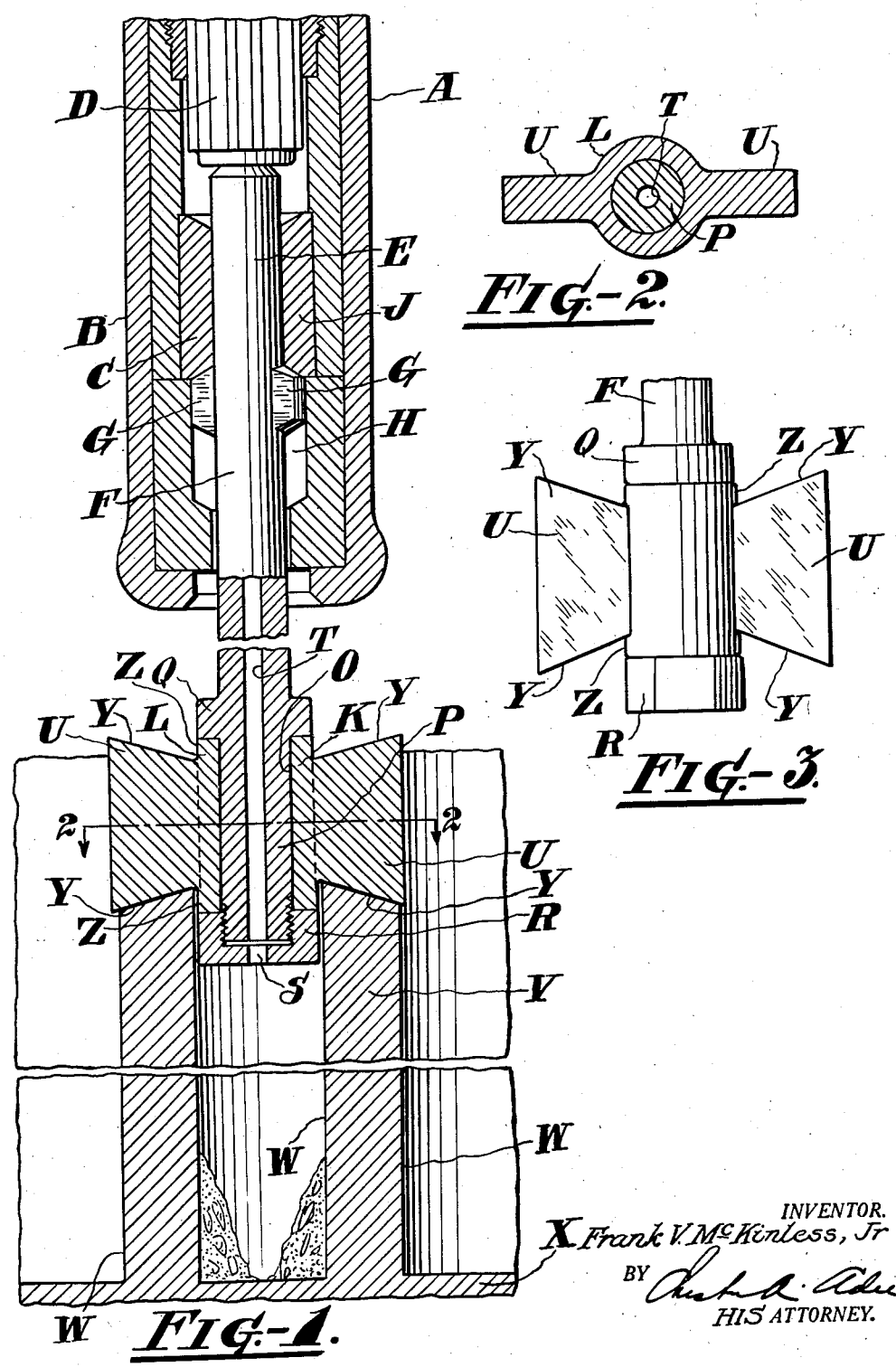
INVENTOR.
Frank V. McKinless, Jr
BY
HIS ATTORNEY.

Patented Dec. 26, 1933

1,941,217

UNITED STATES PATENT OFFICE 1,941,217

BROACHING TOOL

Frank V. McKinless, Jr., White Plains, N. Y., assignor to Ingersoll-Rand Company, Jersey City, N. J., a corporation of New Jersey Application August 17, 1932. Serial No. 629,125

3 Claims. (Cl. 255—62)

This invention relates to rock cutting implements, and more particularly to a broaching tool of the type used for removing the wall of rock between adjacent holes of a series drilled along a line on which it is desired to sever a block of rock from the bed or mass.

One object of the invention is to assure the retention of the broaching tool in the correct position with respect to the desired line of cut.

Another object is to expedite the operation of broaching the material between adjacent drill holes.

Still another object is to prolong the period of service of tools of this character.

Other objects will be in part obvious and in part pointed out hereinafter.

In the accompanying drawing illustrating a preferred form which the invention may assume in practice and in which similar reference characters refer to similar parts, Figure 1 is a sectional elevation of a broaching tool constructed in accordance with the practice of the invention and showing a practical application thereof, Figure 2 is a transverse view taken through Figure 1 on the line 2—2 looking in the direction indicated by the arrows, and Figure 3 is a side elevation of the broaching tool and a portion of the shank to which it is attached.

Referring more particularly to the drawing, A designates, in general, a rock drill of which only the front end is shown. The rock drill A comprises the usual front head B having chuck mechanism C therein and a reciprocatory hammer piston D for delivering blows of impact to the shank E of the broaching tool F.

The shank E may be of any suitable length and of a well known type carrying oppositely disposed lugs G to engage ribs H in the chuck mechanism and to seat against a chuck bushing J in the chuck mechanism C for limiting the distance which the shank E may extend into the front head.

The broaching tool F constructed in accordance with the practice of the invention comprises, in addition to the shank E, a cutting implement K having a body portion L wherein is a bore O to receive an extension P on the front end of the shank E. On the shank E is a shoulder Q to act as an abutment for the rear end of the body portion L, and the front end of the extension P is threaded for the accommodation of a securing device, illustrated in this instance as a cap nut R which seats against the front end of the body portion L to retain the cutting implement K in fixed position on the extension P.

Preferably the cap nut R is provided with an aperture S which registers with the passage T in the shank E for conveying cleansing fluid to the work to remove the cuttings therefrom.

On diametrically opposed sides of the body portion L of the cutting implement are wings U for removing walls V between the adjacent holes W of a series drilled in line in the rock X.

The wings U are of identical conformation. Each wing is provided with front and rear cutting surfaces Y which incline in the same degree with respect to the body portion L although in opposite directions so that the outermost ends or edges are the portions of maximum length of the wings.

As a preferred form of construction the body portion L is provided with front and rear projections Z of which that at the front end may cooperate with the cap nut R to serve as a pilot for retaining the cutting implement in substantially the correct position with respect to the walls V.

In the operation of the device the cutting implement K is disposed on the extension P and clamped securely against the shoulder Q by the cap nut R, or such other means as may be provided for this purpose. The cap nut R, together with the adjacent projection Z, is then entered into a drill hole W and the wings U are seated upon the walls of rock V intended to be removed. During the subsequent operation of the rock drill the cuttings resulting by breaking down the walls V and which will, of course, fall into the drill holes may be expelled therefrom by cleansing fluid introduced into the drill hole through the passsage T in the shank and the aperture S in the cap nut R. The cap nut R together with the projection Z of the body portion will serve as a pilot to maintain the wings U in the correct cutting position.

Whenever, due to prolonged or severe usage the cutting edges Y at one end of the cutting implement become worn or otherwise unserviceable the implement K may be reversed upon the extension P and the opposite ends or cutting edges Y may then be used to cut the walls V of the rock.

I claim:

1. A broaching tool comprising a shank having an extension, a shoulder on the extension, a body portion having a bore to receive the extension, a laterally extending wing on the body portion increasing in length in the direction of its free end and having front and rear cutting edges, and means for clamping the body portion against the shoulder.

2. A broaching tool comprising a shank having an extension, a shoulder on the extension, a body portion having a bore to receive the extension, a pair of laterally extending opposed wings on the body portion increasing in length in the direction of their outer ends and having cutting edges on the front and rear ends thereof, and means threadedly connected to the extension to clamp the body portion against the shoulder.

3. A broaching tool comprising a shank having an extension, a shoulder on the extension, a body portion having a bore to receive the extension, a pair of diametrically opposed wings on the body portion, front cutting edges on the tool inclined forwardly relative to the center line of the tool, rear cutting edges inclined rearwardly relative to the center line of the tool, front and rear pilot projections on the body portion, and means threaded on the extension to clamp the body portion against the shoulder and to serve as an extension for the front pilot projection.

FRANK V. McKINLESS, Jr.